United States Patent [19]
Mätzold et al.
[11] Patent Number: 4,481,671
[45] Date of Patent: Nov. 6, 1984

[54] REMOTE CONTROL SYSTEM, PARTICULARLY FOR REMOTE RADIO TRANSMITTER CONTROL

[75] Inventors: Uwe Mätzold, Salzgitter; Dieter Heiss, Hildesheim, both of Fed. Rep. of Germany

[73] Assignee: Robert Bosch GmbH, Stuttgart, Fed. Rep. of Germany

[21] Appl. No.: 435,685

[22] Filed: Oct. 21, 1982

[30] Foreign Application Priority Data

Nov. 12, 1981 [DE] Fed. Rep. of Germany ....... 3144973

[51] Int. Cl.[3] ............................................... H04B 1/02

[52] U.S. Cl. ........................................ 455/92; 455/45; 455/70; 340/825.72

[58] Field of Search ...................... 455/35, 45, 92, 227, 455/228, 18, 68, 70; 340/825.48, 825.72; 381/105

[56] References Cited

U.S. PATENT DOCUMENTS 3,577,080 5/1971 Cannalte .............................. 455/92
3,657,655 4/1972 Fukata .................................. 455/35
3,922,607 11/1975 Wysong ............................... 455/45
4,024,475 5/1977 Bragas et al. ........................ 455/228

FOREIGN PATENT DOCUMENTS 2453354 5/1976 Fed. Rep. of Germany ........ 455/35
2527857 1/1977 Fed. Rep. of Germany .

*Primary Examiner*—Jin F. Ng
*Attorney, Agent, or Firm*—Frishauf, Holtz, Goodman & Woodward

[57] ABSTRACT

To decode control signals from a mixture of signals including audio signals, such as music, voice or speech, in which the control signals are within the audio range, for example 2,350 Hz, on which a low-frequency signal, for example in the 100–200 Hz range is modulated, the control signal in the form of a control tone is filtered and demodulated by band pass filters (1,3), demodulators and rectifiers (2,4), and then applied to a timing circuit (5) which provides an output signal if and only if the demodulated control tone is continuously applied during the timing interval thereof. Suitable timing intervals are about 1 second, to provide an output signal which can switch a flipflop (7) on, for example to command radiation of a particular type of recognition signal by the transmitter (13), the setting of the flipflop (FF) (7) being fed back to the timing circuit to change the timing interval thereof to a lesser amount, for example ½ seconds, to provide for a shorter signal to cause resetting of the FF (7). A second timing circuit (9) is provided to turn OFF the FF (7) in case it is overlooked to generate a 0.5 turn OFF signal and apply it to the first timing circuit (5).

17 Claims, 2 Drawing Figures

REMOTE CONTROL SYSTEM, PARTICULARLY FOR REMOTE RADIO TRANSMITTER CONTROL

Reference to related patent and applications assigned to the assignee of this application and incorporated herein by reference:

U.S. Pat. No. 3,949,401, Hegeler et al, issued Apr. 6, 1976

U.S. Ser. No. 319,653, filed Nov. 9, 1981, now U.S. Pat. No. 4,435,843, Eilers and Bragas, "Communication System and Transmitter Therefor, Including Special Announcement Recognition".

U.S. Ser. No. 319,654, filed Now. 9, 1981 now U.S. Pat. No. 4,435,843, Eilers and Bragas.

"FM Receiver for General Programs and Special Announcements"

U.S. Ser. No. 319,655, filed Nov. 9, 1981, now U.S. Pat. No. 4,450,589, Eilers and Bragas.

"FM Receiver for Reception of Special Announcements and General Programs".

The present invention relates to a remote control system, and more particularly to a remote control system in which switching signals are transmitted over control lines which also carry intelligence information within the same frequency band as the switching signals, and especially switching signals or control signals which are to be decoded and distinguished from a mixture of signals within the audio range.

The referenced Hegler patent, U.S. Pat. No. 3,949,401, as well as the referenced Eilers and Bragas U.S. Pat. No. 4,435,843, described transmission systems which, besides providing program information, can also radiate special announcements. In order to be able to receive the special announcements, and to know which transmitters radiate these special announcements, the transmitters radiate besides the normal program content a subcarrier which, in accordance with the standards established by European sytems, are modulated in the form of 57 kHz signals by frequency modulation on the transmitter carrier. This 57 kHz subcarrier is selected as the third harmonic of a 19 kHz stereo pilot tone, being radiated in synchronism therewith if the transmitter is a stereo transmitter. The auxiliary 57 subcarrier is phase-locked to the 19 kHz subcarrier, such that the zero crossings of the two subcarriers will occur in the same direction and simultaneously. The auxiliary 57 kHz subcarrier is utilized to transmit additional information by amplitude modulation thereof. This additional information is in the form of recognition information to characterize the presence of an announcement, or special program, and a particular region, or radio station.

In accordance with the proposed system, the transmitter radiates continuously the 57 kHz subcarriers, modulated by the region, or radio station recognition signal, hereinafter the RR signal, which has a frequency assigned to the particular transmitter, or to a particular group of transmitters within certain geographical region, for example. Additionally, and while an announcement, or special program is being radiated, the transmitter will also radiate the subcarrier modulated by an additional announcement recognition signal, hereinafter the AR signal.

The AR signal typically is a very narrow band signal within a small frequency range between, for example, 100 to 200 kHz. In accordance with some systems which have been proposed, the AR signal may have a frequency of 125 Hz. Any receiver capable of decoding the respective RR and AR signals, and which has a 57 kHz detector, can then be switched by an amplitude demodulator to control the reproduction of the special program or announcement. For example, during the broadcast of the special program or announcement, the amplitude of reproduction can be raised, or the audio stage of the receiver can be enabled if it had previously been muted; alternatively, reproduction from a cassette or cartridge recorder coupled to the receiver can be inhibited and the receiver switched, instead, to reproduce the special program or announcement. As soon as the special program or announcement is terminated, the receiver will revert to its previous state, for example, by switching back to reproduce a program from a cassette.

Additional and other switching can be carried out by decoding the RR and the AR signals. As an example, a special frequency can be assigned for emergency notices which, when bing radiated, can enable or connect a radio reproducing apparatus by connecting the audio stage thereof, or to provide an alarm signal, for example to indicate a major disaster, or permit the reproduction of information with respect to emergency situations.

The apparatus to generate the various recognition signals is usually located directly at the transmitter station. The studios which control the program content, however, usually are geographically separated from the transmitters. Additional control lines and control wires are frequently not available between the studio and the transmitter installation, in order to control radiation of the respective recognition signals. Consequently, to enable the recognition signal generators to function, it has been proposed to feed a control tone into the circuit system which also carries the intelligence modulation to the transmitter. Typical control tones have a frequency which falls within the audio frequency range. A typical frequency is, for example, 2,350 Hz, which is frequency moduiated by a further frequency of, for example 123, Hz. In order to connect the announcement recognition signal generator, the control tone is applied to the transmission line for a certain period. For example, 1.2 seconds; to then disconnect the AR signal generator, a switch OFF tone of about 0.5 seconds is applied to the modulating, or audio line. The transmitter then includes filters in which the control tone is filtered from the frequency mixture, and applied to an integrator. When an integrating capacitor of the integrator reaches a certain threshold voltage level upon having sensed the control tone for a predetermined interval; the AR signal generator is turned ON, or turned OFF, respectively.

It has been found that erroneous switching may occur if, during the transmission of the control tone, the audio line carries additional audio information signals, for example, music or speech, which include the particular frequencies, or are similar to the frequencies of the control tone. These signals, then, will also cause charging of the capacitor in the integrating circuit, so that, if the particular frequencies to which the control system is to be responsive just happen to occur, erroneous switching may result. Consequently, the announcement recognition signal may be enabled, or disabled, without being specifically commanded. Disconnecting the AR signal requires a shorter integration time. Thus, the situation may occur that the announcement recognition, or AR signal, is turned OFF prior to actual termination of transmission of the announcement or special program. If, within a receiver, switching networks respond to the presence of the AR signal, the receiver may cut off part of the announcement which was intended to be heard.

THE INVENTION

It is an object to provide a remote control system utilizing control lines which carry a mixture of low-frequency signals, for example within the audible range, and producing an output signal by selection and decoding of a control signal from the mixture of low-frequency signals, without responding to signals which may occur spuriously.

Briefly, a timing circuit is provided, connected to receive a rectified signal representative of the modulating tone, the timing circuit being so arranged that it will produce the output signal if and only if the rectified modulating signal continuously persists for a predetermined time duration.

The system has the advantage that spurious switching events are effectively prevented from occuring.

The timing constant of the timing circuit, preferably, is changeable, with switch-over between a longer timing constant and a shorter timing constant occurring in dependence on the switching state of the recognition signal in the transmitter. In accordance with the feature of the invention, a flipflop (FF) or similar control element is used to connect the respective recognition signal generator to modulate the subcarrier. The FF preferably then is SET by a first control signal and RESET by a second control signal.

In accordance with a further feature of the invention, a second timing circuit can be used which automatically resets the FF or the control circuit, respectively, after a predetermined time has elapsed. This prevents retention of the recognition signal, and radiation thereof continuously, and automatically limits the time during which the respective recognition signal can be radiated. This is an additional safeguard in case the announcer, or transmitter-operator has failed to remember to provide a RESET, or announcement termination signal.

The apparatus is particularly suitable to control recognition signals in transmitters in which the particular announcement relates to important data or information items, such as announcements pertaining to traffic safety, weather disturbances, or other announcements of important public information character.

DRAWINGS

FIG. 1 is a schematic diagram of a transmitter system for which the present invention is applicable, and FIG. 2 is a schematic block diagram illustrating the system in accordance with the present invention.

DETAILED DESCRIPTION

Figure 1:
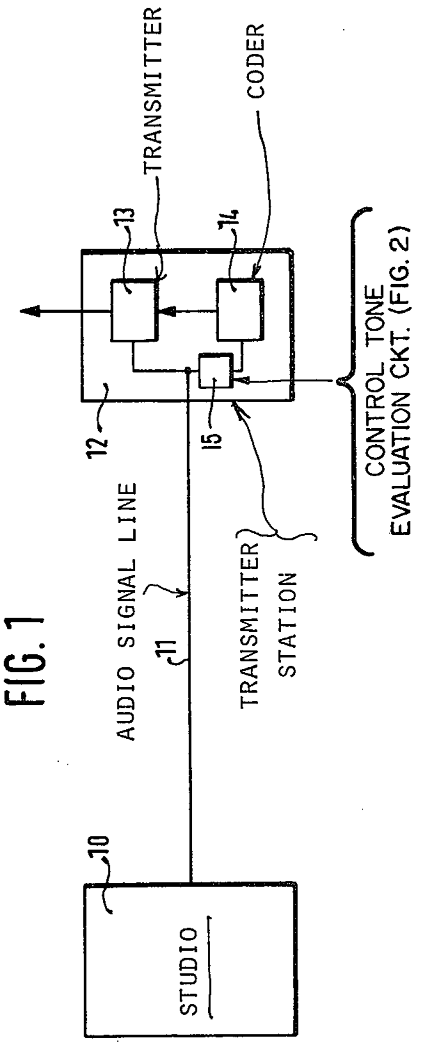

FIG. 1 is a block diagram of an FM transmitter system, in which a studio 10 is shown schematically. Intelligence information, for example music programs, reports and the like, are generated within the studio 10, for subsequent radiation. Studio 10 also includes apparatus to generate control tones which are to be transmitted over the same transmission lines 11 to a transmitter station 12, as the intelligence signals. The transmission line 11, thus, will carry voice signals, music signals, and, when enabled, additionally control signals from the studio 10 to the transmitter station 12. The transmitter station 12 includes a transmitter 13 and a coder 14. The modulation signal is connected to the transmitter 13 and to the coder 14. Coder 14, for example, may be constructed in accordance with U.S. Pat. application Ser. No. 415,443 filed Sept. 7, 1982, by the inventors hereof, entitled "Radio Transmitter System with Special Program Identification", or, in accordance with a coder described in German patent disclosure document DE-OS No. 31 21 087. The signals radiated by the transmitter 13, as coded by coder 14, are described in the aforementioned U.S. Pat. NO. 4,435,843. The control signal is evaluated in evaluation and selection circuit 15 in order to cause the coder to provide the respectively commanded recognition signal, for example the announcement recognition AR signal.

Figure 2:
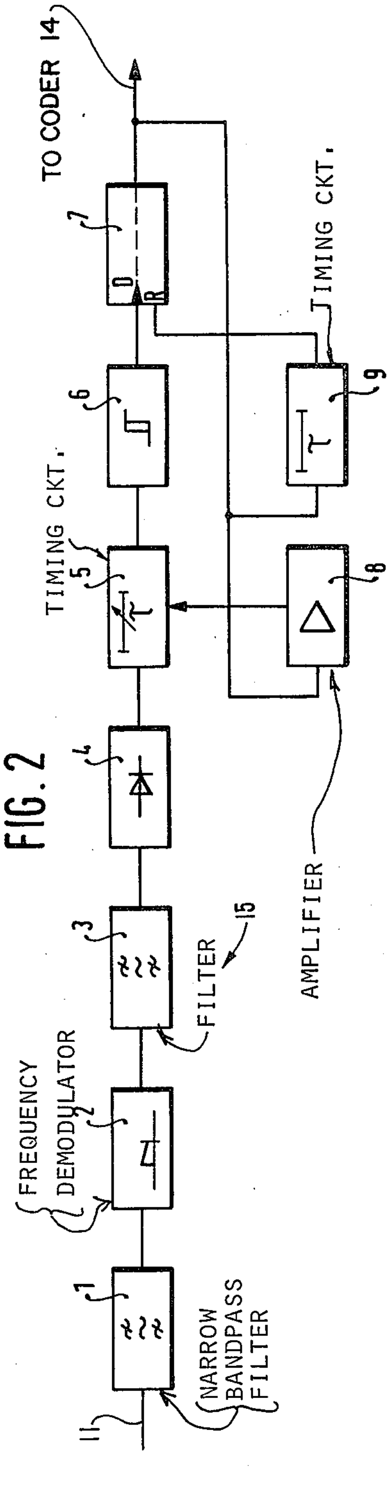

A selection and evaluation circuit 15 to select a modulated control tone within the audio range from a signal transmitting audio information, for example music, voice, speech, in other words a mixture of audio frequencies, is illustrated in FIG. 2. The output line 11, from the studio, is connected, at the transmitter station 12, to the selection and evaluation circuit 15, at an input of a band pass filter 1. Band pass filter 1 has a center frequency selected to filter out the control tone, for example 2,350 Hz, utilizing the example previously referred to.

A frequency demodulator 2 is connected to the band pass filter 1. The demodulator 2 will have the filtered frequency modulated 2.350 Hz signal applied thereto, and will provide an output signal which was modulated on the control tone. Again, utilizing the example previously referred to, this FM modulation frequency will be 123 Hz. This 123 Hz signal is applied to a selective filter 3. Filter 3 is provided to reject any other frequencies which, possibly, could be modulated on the 2,350 Hz carrier or tone. The 123 Hz signal is then applied to a rectifier 4 and, after rectification, is applied to a timing circuit 5.

Timing circuit 5 is so designed that it will provide an output signal only if its input is continuously enabled during its timing interval, in other words, it will transfer signals only if they have been applied during the timing interval without interruption to the circuit 5. This, effectively, eliminates noise and stray pulses which could have occurred in the transmission path, and also eliminates short-time noise or disturbance signals, since they cannot pass the timing circuit 5. For example, if the timing interval for an announcement recognition is set to be one second, then the signal will be passed by the timing circuit 5 if and only if it is continuously applied thereto for a period of at least 0.9 seconds.

The output of the timing circuit 5 is connected to a Schmitt trigger 6 in order to provide wave shaping. Schmitt trigger 6 is connected to a flipflop (FF)7, which preferably is of the D-FF type. A first signal will cause FF to be turned ON, or SET. A subsequent signal applied to FF7 will cause the FF to turn OFF, or to RESET. The output line of the D-FF7 is connected to a switch (not shown) of the coder 14 which is so connected that the output signal of the coder 14 will then be applied to the transmitter 13. An amplifier 8 is also provided, connected to the output of the FF7, and activated thereby. The amplifier 8, upon activation, will change the timing of the timing circuit 5 upon receipt of a subsequent pulse. This, then, can be used to provide an announcement-off pulse of shorter time duration in order to cause resetting of FF7. For example, to turn the FF ON, the time of one second is suitable, with a timing duration of the timing circuit 5 of 0.9 seconds; to turn the FF7 OFF, a timing duration of 0.5 seconds is suitable, so that the timing circuit 5, for reliable operation, should have a timing interval of, for example, about 0.4 seconds. Thus, after having been SET, the pulse from D-FF7 will cause amplifier 8 to change the timing interval of the timing circuit 5 to reduce the interval to about 0.4 seconds. Utilizing a shorter pulse to turn the coder OFF has the advantage that an erroneous second generation of an OFF pulse will not cause the coder to be turned ON, since the timing interval of the OFF pulse of 0.4 seconds will be insufficient to cause the timing circuit to respond when it is set for 0.9 seconds. Consequently, using an ON pulse which is substantially longer than the OFF pulse, contributes to reliability of switching.

In accordance with the feature of the invention, the output of the D-flipflop 7 is connected to a second timing circuit 9. The output of the timing circuit 9 is connected to the reset input of the D-FF7. Timing circuit 9 is provided to insure that, after a predetermined time, the D-FF7 is reset in any event, and to disconnection of the AR signal from the coder. Thus, the AR signal will be disabled from radiation even if someone in the studio 10 has forgotten to provide an AR-OFF signal.

Various types of coders may be used, so that different AR signals can be radiated. For example, the type of program being radiated based on the announcement can be varied; one type of AR signal, for example of one frequency, may be provided to radiate traffic reports, another one sport reports, and another one general news. The ultimate recognition of the type of announcement which is to be given can be controlled by modulating different control frequencies on the control tone of 2,350 Hz, when utilizing the example selected above. The frame within which the modulated tones are placed may, for example, be in the range of between 100 to 200 Hz. By providing selectively different filters 3, or a filter which can be selectively changed in its filtering pass and rejection characteristics, different AR coders can be activated. Alternatively, the coder may inherently include a programming memory to provide different types of frequencies of recognition signals in accordance with the FM modulation frequency modulated on the 2,350 Hz control tone. A plurality of coders, or a plurality of modes can thus be reliably switched without interference by voice, music, or speech signals, or by other signals to provide different switching effects.

Various changes and modifications may be made within the scope of the inventive concept.

We claim:

1. Remote control system producing an output signal by selection and demodulating a control signal from a mixture of low-frequency signals within the audio range, in which the control signal is formed by a composite signal comprising a carrier tone frequency (2,350 Hz) within the middle audio range and having a modulating frequency (100–200 Hz) of a frequency in the low audio range, and substantially less than said middle audio range, frequency modulated thereon, said system comprising a control signal selection and evaluation circuit including a band pass filter (1) receiving the mixture of signals, said band pass filter being tuned to pass the frequency modulated carrier frequency (2,350 Hz);

a frequency demodulator (2) receiving the filtered, frequency modulated carrier frequency and demodulating the carrier frequency to deliver the modulating frequency (100–200 Hz);

a selection filter (3) tuned to select the modulating frequency;

a rectifier (4) rectifying the modulating frequency and a timing circuit (5) connected to receive the rectified modulating frequency and to produce an output signal if, and only if, the rectified modulating frequency signal persists uninterruptedly for a predetermined time duration to prevent spurious generation of output signals due to random occurrence of signals with audio frequency of approximately the carrier frequency within the mixture of low-frequency signals in the audio range.

2. A system according to claim 1, wherein the timing circuit (5) has a controllable, switchable timing duration.

3. A system according to claim 1, further comprising a switching circuit (7) connected to and controlled by said timing circuit and changing switching states in accordance with signals received from the timing circuit.

4. A system according to claim 3, further including a second timing circuit (9) connected to the output of the switching circuit (7) and providing an output signal connected to the input of the switching circuit upon elapse of a predetermined time interval longer than said time duration, said second timing circuit being enabled upon change-of-state of the switching circuit from a first state to a second state.

5. A system according to claim 3, wherein the timing circuit (5) has a variable timing duration, and includes a control input controlling the timing duration thereof;

and wherein the output of the switching circuit (7) is connected to the control input of the timing circuit to change the timing duration of the timing circuit in accordance with the switching state of the switching circuit.

6. A system according to claim 5, wherein said switching circuit comprises a flipflop (7) controllable to change state from a first state to a second state by a first signal, and to reset from the second state to the first state by a second control signal;

and wherein, if the flipflop (7) is in the second state, the timing duration of the timing circuit is controlled by the flipflop to be shorter than the timing duration when the flipflop is in the first state.

7. A system according to claim 3, wherein said switching circuit comprises a flipflop (7) controllable to change state from a first state to a second state by a first signal, and to reset from the second state to the first state by a second control signal.

8. A system according to claim 7, further including a second timing circuit (9) connected to the output of the flipflop and having a time interval longer than the longest timing duration of said first timing circuit (5), said second timing circuit providing an output to the flipflop to change the flipflop from the second state to the first state after elapse of the timing interval, if no signal is derived from the first timing circuit commanding said change-of-state to the first state in advance of the elapse of the timing interval of the second timing circuit.

9. A system according to claim 1, further including a transmitter studio (10) and a geographically remotely located transmitter station (12), and an audio signal line (11) connecting the studio and the transmitter station, said audio signal line carrying said mixture of low-frequency signals within the audio range and the control signal, and wherein said control signal is representative of information data, transmitter station recognition, and radiated information recognition.

10. System according to claim 9 wherein the remotely located transmitter station (12) includes a radio transmitter (13) radiating signals in the frequency modulation range;

modulating and coding means (14) connected to said transmitter (13) and controlling the transmitter to radiate a subcarrier, modulating its carrier signal and an amplitude recognition modulation within the audible frequency range, modulating the subcarrier;

and wherein the amplitude recognition modulation of the subcarrier is applied to modulate the subcarrier (a) if the rectified modulating frequency persists uninterruptedly for the predetermined time duration and (b) to discontinue modulation by the amplitude recognition modulation of the subcarrier if the rectified modulating frequency persists uninterruptedly for a second predetermined time duration, shorter than said first predetermined time duration.

11. System according to claim 10 wherein the subcarrier has a frequency in the order of 57 kHz, and the amplitude recognition modulation has a frequency of between 100–200 Hz.

12. System according to claim 11 wherein the amplitude recognition frequency is about 125 Hz.

13. Radio transmitter control system to control, from a studio (10), a transmitter station (12) having a transmitter (13) geographically remotely located from said studio, the transmitter radiating a recognition signal which is, selectively, amplitude modulated on a frequency modulated subcarrier, and wherein an audio signal line (11) is provided, connecting the studio (10) and the transmitter station (12), said audio signal line carrying a mixture of low-frequency signals within the audio range for radiation by the transmitter, said transmitter is provided with a coder (14) responding to a control signal from the studio and generating a recognition control signal for radiation of the recognition signal by the transmitter;

and wherein the control signal comprises a composite signal formed of a carrier tone frequency (2350 Hz) in the middle audio range, which is frequency modulated by a modulating frequency (100–200 Hz) in the low audio range and substantially less than said middle audio range, and persisting for a predetermined time duration said system comprising a control signal selection and evaluation circuit (15) connected to and receiving, from the studio, the mixture of low-frequency signals and the control signal, and separating said control signal from said mixture, including a band pass filter (1) receiving the mixture of signals, said band pass filter being tuned to pass the frequency modulated carrier frequency (2350 Hz);

a frequency demodulator (2) receiving the filtered, frequency modulated carrier frequency and demodulating the carrier frequency to deliver the modulating frequency (100–200 Hz);

a selection filter (3) tuned to select the modulating frequency;

a rectifier (4) rectifying the modulating frequency;

and a timing circuit (5) connected to receive the rectified modulating frequency and producing and output signal if, and only if, the rectified modulating frequency persists uninterruptedly for a time period which is substantially that of said predetermined time duration to prevent spurious radiation of said recognition signal by the transmitter due to random occurrence of signals within the mixture of low-frequency signals on the audio signal line (11) and having at least approximately the frequency of said carrier tone frequency (2350 Hz).

14. System according to claim 13, wherein the timing circuit (5) has a controllable, switchable timing duration.

15. System according to claim 13, further including a switching circuit (7) connected to and controlled by said timing circuit (5) and controlling selective radiation of the recognition signal by amplitude modulation of the frequency modulating subcarrier being radiated by the transmitter, said switching circuit changing switching states in accordance with signals received from the timing circuit.

16. System according to claim 13, further including a switching circuit (7) connected to and controlled by said timing circuit (5) and controlling selective radiation of the recognition signal by amplitude modulation of the frequency modulating subcarrier being radiated by the transmitter, said switching circuit changing switching states in accordance with signals received from the timing circuit;

wherein the control signal has a first predetermined time duration to cause the switching circuit to change state from a first state to a second state, and a second predetermined time duration to change state from the second state back to the first state;

wherein the timing circuit (5) has a variable timing duration and includes a control input controlling the timing duration thereof;

and wherein the output of the switching circuit (7) is connected to the control input of the timing circuit to change the timing duration of the timing circuit in accordance with the switching state of the switching circuit.

17. System according to claim 16, further including a second timing circuit (9) connected to the output of the switching circuit (7) and providing an output signal connected to the input of the switching circuit (7) upon elapse of a timing interval which is longer than the longest timing duration of said first timing circuit (5), said second timing circuit being enabled upon change-of-state of said switching circuit (7) from the first state to the second state.

* * * * *